United States Patent
Crimi et al.

(10) Patent No.: US 7,646,566 B1
(45) Date of Patent: Jan. 12, 2010

(54) SLIDER DEFORMATION CONTROL BY THERMAL-STRUCTURAL COMPENSATORS

(75) Inventors: Francis P. Crimi, Los Altos, CA (US); Timothy A. Riener, Fremont, CA (US); Stephen P. Williams, Morgan Hill, CA (US); Brian D. Strom, Cupertino, CA (US)

(73) Assignee: Maxtor Corporation, Longmont, CO (US)

( * ) Notice: Subject to any disclaimer, the term of this patent is extended or adjusted under 35 U.S.C. 154(b) by 510 days.

(21) Appl. No.: 11/042,736

(22) Filed: Jan. 25, 2005

Related U.S. Application Data

(60) Provisional application No. 60/599,208, filed on Aug. 5, 2004.

(51) Int. Cl.
*G11B 5/60* (2006.01)
(52) U.S. Cl. .................. 360/236.5; 360/235.3; 360/128
(58) Field of Classification Search ............... 360/235.1, 360/234.4, 235.3, 236.5, 128; 29/603.03
See application file for complete search history.

(56) References Cited

U.S. PATENT DOCUMENTS

| | | | | |
|---|---|---|---|---|
| 5,862,011 | A * | 1/1999 | Sega et al. ............... | 360/98.01 |
| 6,836,389 | B2 * | 12/2004 | Macken et al. ........... | 360/235.1 |
| 6,870,709 | B2 | 3/2005 | Shimanouchi et al. | |
| 6,914,750 | B2 * | 7/2005 | Garfunkel et al. ........ | 360/234.3 |
| 7,320,168 | B2 * | 1/2008 | Han et al. ................ | 29/603.13 |
| 2002/0176208 | A1 * | 11/2002 | Serpe et al. .............. | 360/235.7 |
| 2004/0027717 | A1 * | 2/2004 | Alfoqaha et al. ............ | 360/126 |
| 2004/0061974 | A1 * | 4/2004 | Macken et al. ........... | 360/235.1 |
| 2006/0061910 | A1 * | 3/2006 | Thurn et al. ............. | 360/234.7 |

FOREIGN PATENT DOCUMENTS

| | | | |
|---|---|---|---|
| EP | 1398763 A1 * | 3/2004 | |
| JP | 60052912 A * | 3/1985 | |
| JP | 07153049 A * | 6/1995 | |

OTHER PUBLICATIONS

English translation of JP 60-052912 A to Goto, published on Mar. 26, 1985.*

* cited by examiner

*Primary Examiner*—William J Klimowicz
(74) *Attorney, Agent, or Firm*—Campbell Nelson Whipps LLC

(57) ABSTRACT

A disk drive includes a drive circuitry, a storage disk, a suspension and a slider. The slider is supported by the suspension and receives electrical current from the drive circuitry. The slider includes a flying side that generally faces the storage disk, a read/write head, and a slider deformer that is electrically decoupled from the drive circuitry. In one embodiment, the slider deformer is formed from a material having a coefficient of thermal expansion that is greater than a coefficient of thermal expansion of other portions of the slider. In this embodiment, the slider deformer causes a deformation of a portion of the flying side when the temperature of the slider deformer changes. Thus, when the read/write head expands or contracts due to a change in temperature of the slider, the slider deformer at least partially offsets the expansion and/or contraction of the read/write head to maintain a substantially consistent head-to-disk spacing of the disk drive.

38 Claims, 8 Drawing Sheets

SLIDER DEFORMATION CONTROL BY THERMAL-STRUCTURAL COMPENSATORS

RELATED APPLICATION

This application claims the benefit on U.S. Provisional Application Ser. No. 60/599,208 filed on Aug. 5, 2004. The contents of U.S. Provisional Application Ser. No. 60/599,208 are incorporated herein by reference.

BACKGROUND

Disk drives are widely used in computers, consumer electronics and data processing systems for storing information in digital form. The disk drive typically includes one or more storage disks and one or more head suspension assemblies. Each head suspension assembly includes a slider which has an air bearing surface, a leading edge, a trailing edge and a read/write head positioned near the trailing edge. The read/write head transfers information to and from the storage disk. Rotation of the storage disk causes the slider to ride on an air-supported journal bearing (also referred to as an "air bearing") so that the read/write head is at a distance from the storage disk that is commonly referred to as a "head-to-disk spacing".

Because today's disk drives utilize storage disks having increasingly high densities of data tracks, decreasing the head-to-disk spacing has become of great importance. However, this desire for a very small head-to-disk spacing must be balanced with tribological concerns in order to avoid damage to the read/write head and/or the storage disk, as well as loss of data.

Maintaining a relatively small and consistent head-to-disk spacing is further complicated by other factors. In particular, the read/write head includes a write head having an electrical conduction path, generally referred to as a "write element". During a write operation, the electrical resistance of the electrical circuitry in the write element generates heat in and around the read/write head. A temperature increase causes thermal expansion of portions of the slider toward the storage disk, known as write pole tip protrusion ("WPTP"). In addition, environmental temperature increases within the disk drive that are independent of heating the write element and that act on a more global scale can also result in environmental pole tip protrusion ("EPTP") in a direction that is generally toward the storage disk. If pole tip protrusion is excessive, the slider can unintentionally contact the storage disk ("head-to-disk contact"), causing off-track writing, degraded data transfer rates, damage to the slider, damage to the storage disk and/or a permanent loss of data.

Conversely, a temperature decrease in the drive will generally induce the opposite effect on the EPTP—the pole tips will retract from the disk. Such retraction can decrease the performance of the reading and writing process since larger spacing can generally degrade the information transfer to and/or from the disk.

Moreover, in conventional disk drives, the majority of the slider is often primarily formed from ceramic materials such as alumina titanium carbide ($Al_2O_3$—TiC), and can be secured to a suspension assembly that is typically formed from metal materials such as stainless steel. Environmental heat can cause deformation of the suspension assembly, which can result in a concave deformation of the slider. The concavity of the slider often occurs in a direction from the leading edge to the trailing edge, also referred to herein as the "crown" direction as temperature within the disk drive increases. This concavity results in the trailing edge, and thus the read/write head, moving closer to the storage disk, further risking or actually causing unwanted head-to-disk contact. Further, if the temperature of the read/write head decreases, the opposite effect can occur, e.g. the slider crown moves in the direction of being more convex (or at least less concave) resulting in an increase in head-to-disk spacing with potentially adverse implications, as indicated above.

SUMMARY

The present invention is directed to a disk drive that includes a drive circuitry, a storage disk, a suspension and a slider. The slider is supported by the suspension and receives electrical current from the drive circuitry. The slider includes a flying side that generally faces the storage disk, a read/write head, and a slider deformer that is electrically decoupled from the drive circuitry. The slider deformer causes a deformation of a portion of the flying side when the temperature of the slider deformer changes. With this design, when the read/write head expands or contracts due to a change in temperature of the slider, the slider deformer at least partially offsets the expansion and/or contraction of the read/write head to maintain a substantially consistent head-to-disk spacing of the disk drive.

In one embodiment, the slider further includes a support material that contacts and/or supports the slider deformer. In this embodiment, the support material has a first coefficient of thermal expansion, and the slider deformer has a second coefficient of thermal expansion that is greater than the first coefficient of thermal expansion. In another embodiment, the slider deformer can extend at least approximately 25 percent along a width of the slider, or alternatively, along a majority of a width of the slider.

The slider can include a body section and a transducer section that is deposited onto the body section. In this embodiment, the slider deformer can be at least partially embedded within at least one of the body section and the transducer section. Further, the body section can include a notch, and the slider deformer can be at least partially positioned within the notch. In another embodiment, the slider includes a substantially planar back side that is substantially opposite the flying side. In this embodiment, the slider deformer can be at least partially embedded below the back side of the slider. Alternatively, the slider deformer can be at least partially affixed to the back side of the transducer section. In still another embodiment, the slider deformer includes a plurality of discontinuous deformer sections. Further, the slider can also include a slider depression that is at least partially unfilled. In this embodiment, the slider depression is positioned to structurally weaken the slider, thereby allowing the slider deformer to cause greater deformation to the flying side of the slider.

The present invention also includes a method for controlling a head-to-disk spacing in a disk drive.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
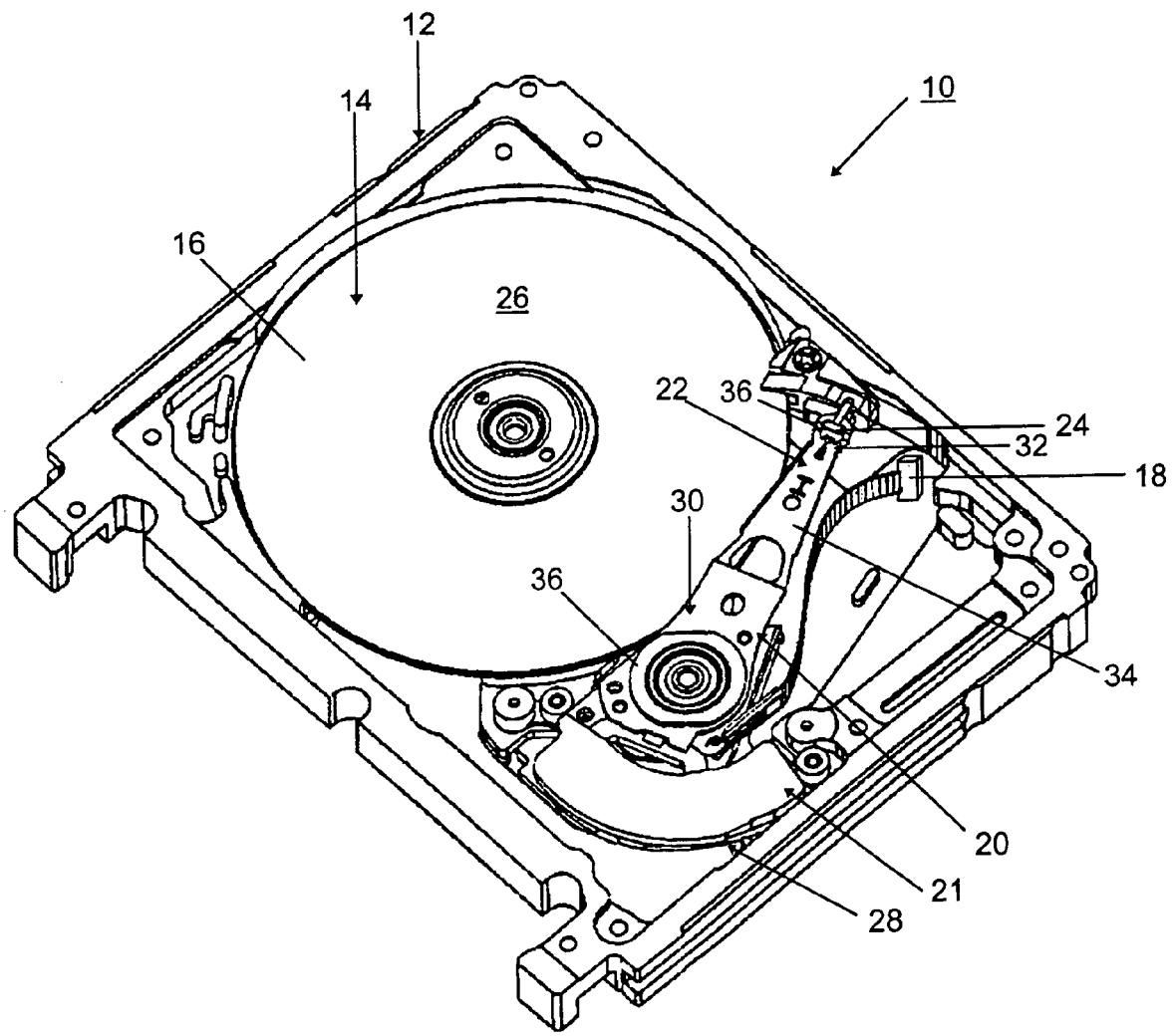
FIG. 1 is a perspective view of a disk drive having features of the present invention.

FIG. 1 illustrates a perspective view of a disk drive 10 that includes (i) a drive housing 12, (ii) a disk assembly 14 having one or more storage disks 16, (iii) a drive circuitry 18, and (iv) a head stack assembly 20 including an actuator assembly 21 and one or more head suspension assemblies 22, with each head suspension assembly 22 including a slider 24.

Each storage disk 16 includes one or more disk surfaces 26 that each has a plurality of concentric data tracks (not shown) that store data, including a target track. Further, the storage disk 16 can also include non-data tracks, such as servo tracks. Once the slider 24 stabilizes over the target track, data is read from the storage disk 16 during a read operation and transferred to the storage disk 16 during a write operation. The drive circuitry 18 sends electrical current to and/or receives electrical signals from the slider 24 during read and/or write operations.

The head stack assembly 20 illustrated in FIG. 1 includes an actuator motor 28, one head suspension assembly 22, and one actuator arm 30. The head suspension assembly 22 is secured to the actuator arm 30, and supports the slider 24 near one of the disk surfaces 26 of the storage disk 16 during operation of the disk drive 10. The actuator motor 28 moves the actuator arm 30 and the head suspension assembly 22 relative to the storage disk 16. The head stack assembly 20 can alternatively include a plurality of actuator arms 30 that each supports up to two head suspension assemblies 22.

Each head suspension assembly 22 includes the slider 24 and a suspension 32 that supports the slider 24. The suspension 32 includes a load beam 34 and a flexure 36. The load beam 34 attaches the flexure 36 and the slider 24 to the actuator arm 30. Each load beam 34 can be flexible in a direction perpendicular to the storage disk 16 and can act as a spring for supporting the slider 24. Typically, the load beam 34 is formed from a metallic material such as stainless steel or other suitable materials. In an alternative embodiment, the load beam 34 and the flexure 36 can be formed as an integral, unitary structure that can utilize homogeneous or non-homogeneous materials.

Each flexure 36 attaches the slider 24 to the load beam 34. The slider can be secured to the flexure with an epoxy material or in other suitable ways known to those skilled in the art. The flexure 36 is formed from a metallic material such as stainless steel or other suitable materials.

The slider 24 transfers information between the drive circuitry 18 and the storage disk 16. The design of the slider 24 can vary depending upon the requirements of the suspension assembly 22 and/or the disk drive 10. The composition of the slider can vary. In one embodiment, portions of the slider 24 can be formed from materials such as alumina titanium carbide ceramic, for example.

Figure 2A:
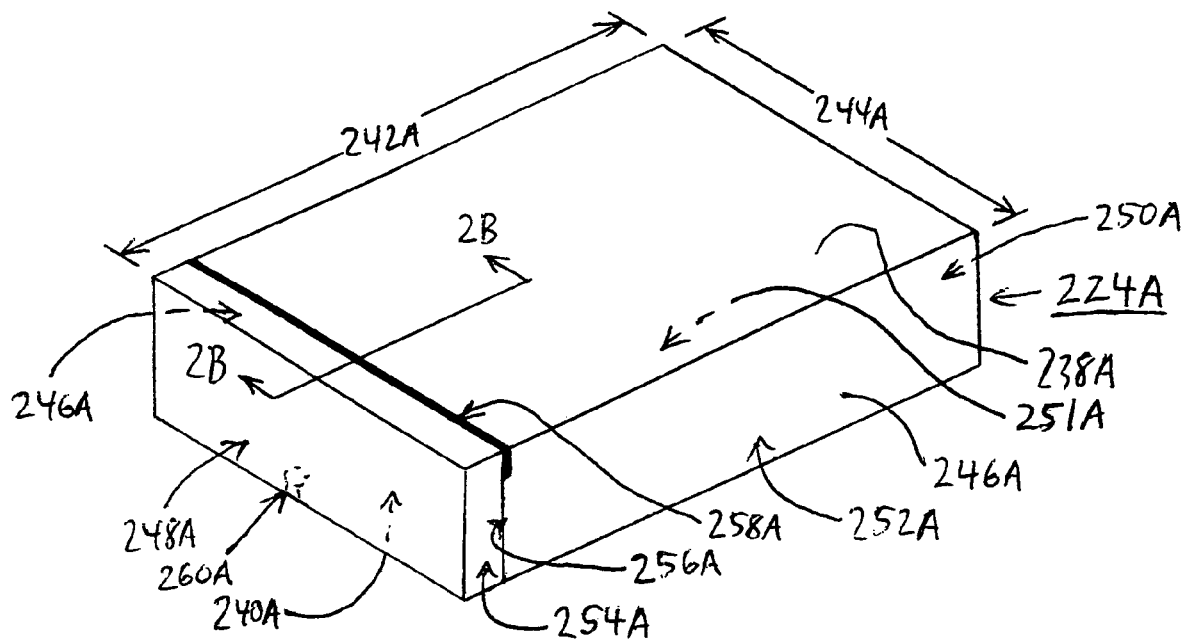
FIG. 2A is a top perspective view of an embodiment of a slider having features of the present invention.

FIG. 2A is a top perspective view of a first embodiment of a slider 224A in accordance with the present invention. The design of the slider 224A can be varied depending upon the design requirements of the disk drive 10 and/or the storage disk 16 (illustrated in FIG. 1). The slider 224A includes a substantially planar back side 238A that generally faces away from the storage disk 16, and a flying side 240A that is substantially opposite the back side 238A. The flying side 240A is also referred to herein as an "air bearing surface". Further, the slider 224A illustrated in FIG. 2A includes a length 242A, a width 244A, a plurality of lateral surfaces 246A, a trailing surface 248A (also referred to as a "trailing edge") and a leading surface 250A (also referred to as a "leading edge") that is substantially opposite the trailing edge 248A. The surfaces 238A, 240A, 246A, 248A, 250A substantially form the bounds of a slider interior 251A.

Further, the slider 224A includes a body section 252A and a transducer section 254A. The body section 252A is generally rectangular in shape, and volumetrically represents the vast majority of the slider 224A. For example, the body section 252A can comprise approximately 95 percent or more of the total volume of the slider 224A. The body section 252A includes the leading edge 250A and a rear body surface 256A that is substantially opposite the leading edge 250A. The material composition of the body section 252A can be varied, but the vast majority or all of the body section 252A is generally formed from a homogeneous material, rather than including different materials that are layered onto one another.

In the embodiment illustrated in FIG. 2A, the body section 252A includes a thermal-structural compensator, which is referred to herein as a slider deformer 258A. The slider deformer 258A is electrically isolated from the drive circuitry 18 (illustrated in FIG. 1) of the disk drive. In this embodiment, with the exception of the slider deformer 258A, the majority or all of the body section 252A is formed from a ceramic material such as alumina titanium carbide ($Al_2O_3$—TiC). As provided in greater detail below, in this embodiment, the slider deformer 258A is formed from a material having properties that differ appreciably from the remainder of the body section 252A.

The transducer section 254A is formed by the addition of one or more distinct layers of material to the rear body surface 256A of the body section 252A. This addition of material can be by various methods known to those skilled in the art. For example, material can be added by electroplate deposition, sputter deposition, or other suitable methods. The transducer section 254A includes a read/write head 260A that magnetically interacts with the storage disk 16 to transfer information between the drive circuitry 18 and the storage disk 16. The transducer section 254A can also be generally rectangular in shape, and is positioned such that the transducer section 254A includes the trailing edge 248A, as illustrated in FIG. 2A.

Figure 2C:
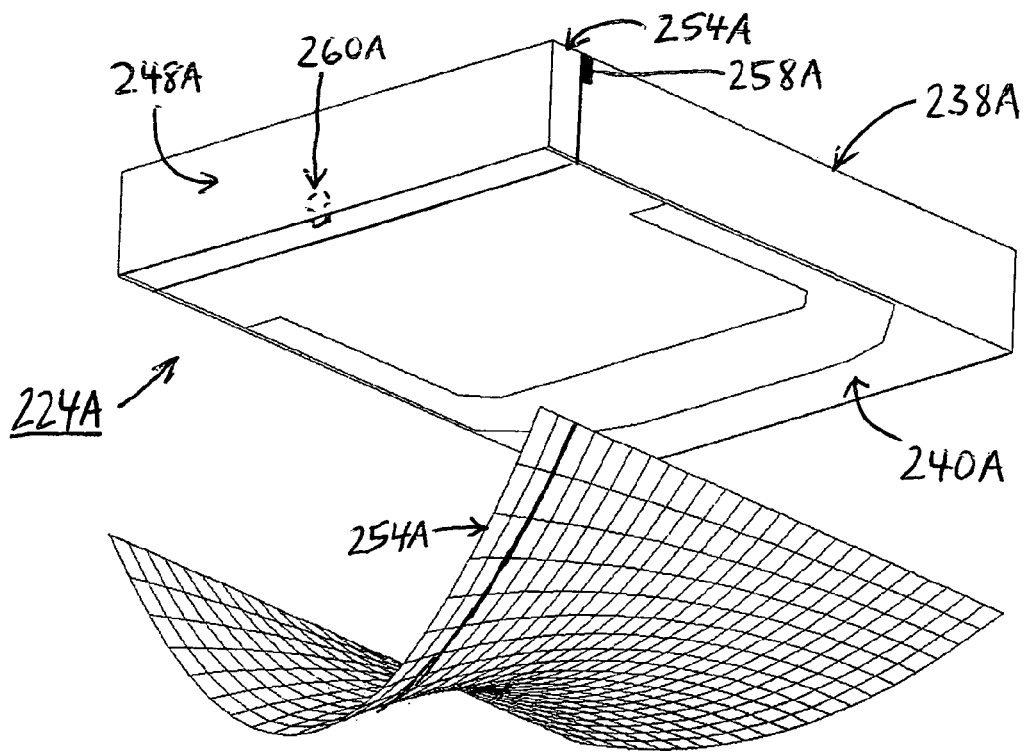
FIG. 2C is a bottom perspective view of the slider and a contour overlay illustrating deformation of a flying side of the slider at a first temperature.
Figure 2B:
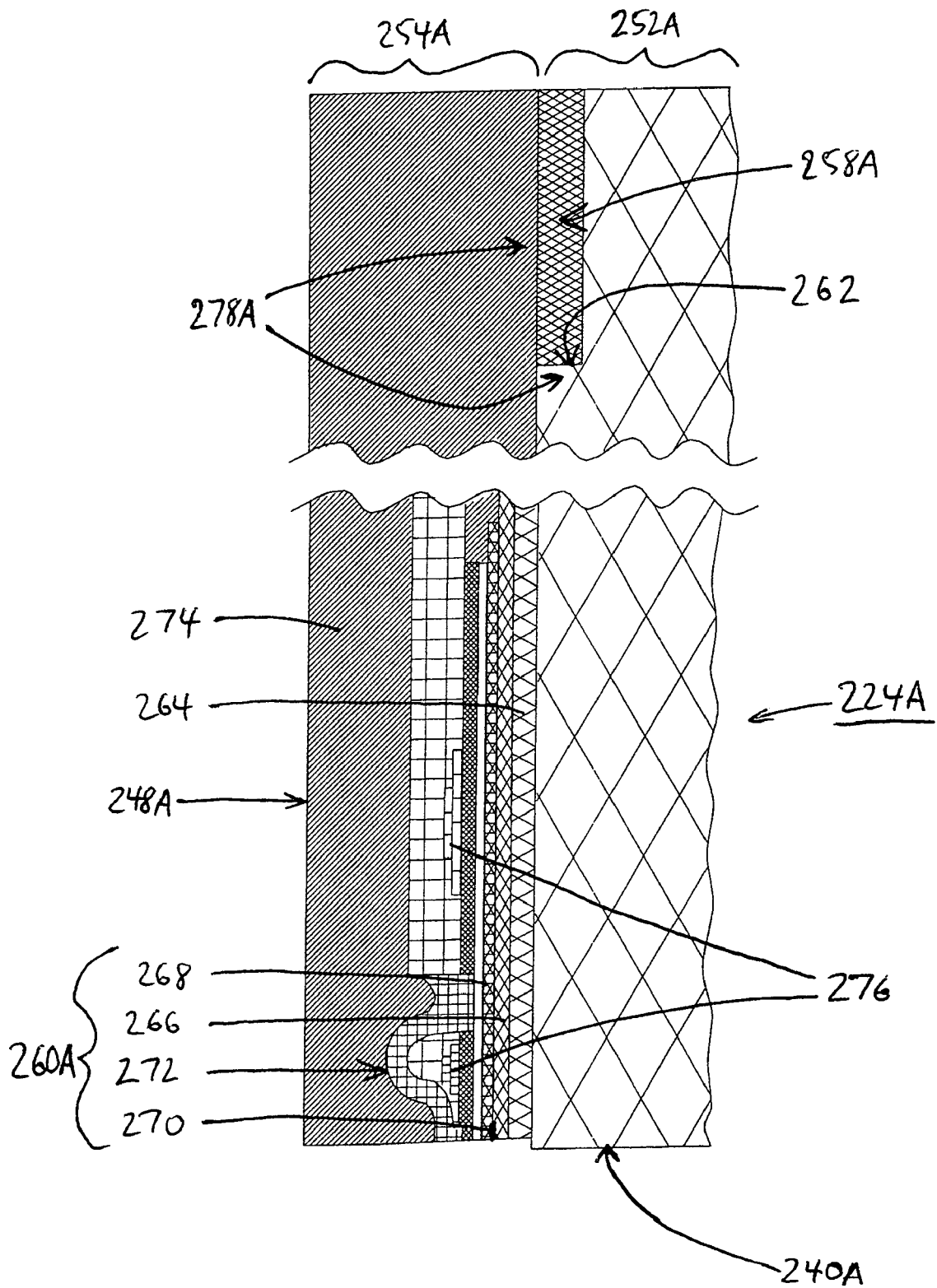
FIG. 2B is a cross-sectional view of the slider taken on line 2B-2B in FIG. 2A.

FIG. 2B is a cross-sectional view of one embodiment of a portion of the slider 224A, taken on line 2B-2B in FIG. 2A. It is recognized that the specific structures that form the transducer section 254A can be varied, and need not include all of the structures illustrated in FIG. 2B. On the other hand, FIG. 2B is not intended to illustrate every possible structure that can be included in the transducer section 254A, and is not intended to limit the scope of the present invention in any way.

As illustrated in FIG. 2B, the slider deformer 258A can be positioned within a groove or notch 262 in the body section 252A. In this embodiment, the notch 262 in the body section 252A is substantially L-shaped and/or U-shaped relative to the entire slider 224A. However, the notch 262 can have any suitable configuration. In the embodiment illustrated in FIG. 2B, the slider deformer 258A can be deposited into the notch 262, and subsequently partially or fully covered by a portion of the transducer section 252A so that the slider deformer 258A is at least partially embedded within the interior of the slider 224A.

In the embodiment illustrated in FIG. 2B, the transducer section 254A includes an electrically insulating undercoat layer 264, a first shield 266 and a spaced apart second shield 268, a read head 270 positioned between the shields 266, 268, a write head 272, and an overcoat layer 274. The undercoat layer 264 can be added directly to the rear body surface 256A of the body section 252A. The undercoat layer 264 is formed from a suitable material such as alumina, and can have an appropriate thickness that can vary according to the design requirements of the disk drive 10.

The shields 266, 268 can be separated by a layer of alumina, and can magnetically decouple the read head 270 from the write head 272. Each shield 266, 268 can be formed from a metallic material such as a nickel-iron alloy, for example. As used herein, the read head 270, the write head 272 and the shields 266, 268 are generally and collectively referred to as the read/write head 260A.

In addition, the write head 272 also includes a write element 276 which generates a relatively substantial amount of heat in and around the write head 272. As provided previously, the heat generated by the write element 276 can cause the write head 272 and surrounding structures of the flying side 240A of the slider 224A to protrude toward the storage disk 16.

The overcoat layer 274 is a layer of material that is deposited or otherwise added over the read/write head 260A, forming the trailing edge 248A of the slider 224A. The overcoat layer 274 protects and electrically insulates the write head 272 and the other layers in the transducer section 254A from direct contact by any materials such as dust or other particulates. The overcoat layer 274 can be formed from various materials such as alumina, for example. In one embodiment, the vast majority of the material that volumetrically comprises the transducer section 254A is alumina.

In one or more of the embodiments described herein, the transducer section 254A and/or the body section 252A can include a support material 278A. As used herein, the support material 278A can include any material that is in direct contact with the slider deformer 258A.

In the embodiment illustrated in FIGS. 2A and 2B, the slider deformer 258A is positioned near the rear body surface 256A of the body section 252A, although this positioning can be varied. More specifically, the slider deformer 258A can be positioned to form a portion of the rear body surface 256A of the body section 252A, upon which one or more layers of the transducer section 254A can be deposited or otherwise secured. The shape of the slider deformer 258A can vary. In the embodiment illustrated in FIG. 2A, the slider deformer 258A is generally rectangular and extends substantially the entire width 244A of the slider 224A.

Further, the dimensions, including the height (e.g., in a direction from the flying side 240A toward the back side 238A of the slider 224A) and thickness (e.g., in a direction from the leading edge 250A toward the trailing edge 248A of the slider 224A) of the slider deformer 258A can vary depending upon the required extent of deformation, and the precise materials used for the slider deformer 258A and the other structures of the slider 224A.

In one embodiment, the slider deformer 258A can have a height that is at least approximately 1% of the overall height of the slider 224A. In non-exclusive alternative embodiments, the slider deformer 258A can have a height that is at least approximately 5%, 10%, 25%, 40%, 50%, 75% or 90% of the overall height of the slider 224A. For example, in one embodiment, the height of the slider deformer 258A is within the range of between approximately 60-100 microns, although the height can be greater or less than this range and/or can vary along the width of the slider deformer 258A.

Additionally, in one embodiment, the thickness of the slider deformer 258A can be at least approximately 10 microns. In non-exclusive alternative embodiments, the thickness of the slider deformer 258A is at least approximately 2, 5, 20, 30, 50 or 100 microns, although the thickness can vary along the width of the slider deformer 258A.

The material composition of the slider deformer 258A can vary. In one embodiment, the slider deformer 258A can be formed from a material having a relatively high coefficient of thermal expansion. It is recognized that the higher the coefficient of thermal expansion, the greater the expansion will be for a given material with an increase in temperature. For example, the coefficient of thermal expansion of the slider deformer 258A can be greater than a coefficient of thermal expansion of the material used to form the remainder of the body section 252A. In one embodiment, the coefficient of thermal expansion of the slider deformer 258A can be greater than approximately $15.0 \times 10^{-6}$ mm/mm/degree C. In other non-exclusive embodiments, the coefficient of thermal expansion of the slider deformer 258A can be greater than approximately $14.2 \times 10^{-6}$, $17.1 \times 10^{-6}$, $17.2 \times 10^{-6}$, or $21.69 \times 10^{-6}$ mm/mm/degree C.

For instance, in one non-exclusive embodiment, the slider deformer 258A can be formed from a metal material such as solder, stainless steel, copper, a nickel-iron material (NiFe), gold, various alloys or other metals, or any suitable non-metallic material. In non-exclusive alternative embodiments, the material used to form the slider deformer 258A has a coefficient of thermal expansion that is at least approximately 5, 10, 25, 50, 75, 100, 150 or 200 percent greater than the coefficient of thermal expansion of a majority of the remainder of the body section 252A.

Additionally or in the alternative, the material used to form the slider deformer 258A has a coefficient of thermal expansion that is greater than the coefficient of thermal expansion of the material that forms the majority of the transducer section 254A. In non-exclusive alternative embodiments, the material used to form the slider deformer 258A has a coefficient of thermal expansion that is at least approximately 5, 10, 25, 50, 75, 100, 150 or 200 percent greater than the coefficient of thermal expansion of the material that comprises the majority of the transducer section 254A.

In one embodiment, the material used to form the slider deformer 258A has a coefficient of thermal expansion that is greater than the coefficient of thermal expansion of at least a portion of the material that is added directly to the slider deformer 258A, e.g. support material 278A that is in contact with the slider deformer 258A. In non-exclusive alternative embodiments, the material used to form the slider deformer 258A has a coefficient of thermal expansion that is at least approximately 5, 10, 25, 50, 75, 100, 150 or 200 percent greater than the coefficient of thermal expansion of at least a portion of the support material 278A.

FIG. 2C is a bottom perspective view of the slider 224A and a graphical representation showing surface effects of the flying side 240A of the slider 224A provided herein at a first temperature of the slider 224A. In one embodiment, the first temperature can prior to startup of the disk drive. For representative purposes and ease of understanding, the surface effects in FIG. 2C have been greatly exaggerated. For example, actual surface effects can be on the order of less than one nanometer, up to approximately 10 nanometers, which would be indiscernible in the Figures if not grossly exaggerated.

FIG. 2C illustrates that the deformation of the flying side 240A of the slider 224A prior to heating the slider 224A can be induced in a substantially localized region, such as in the transducer section 254A near the trailing edge 248A, while the remainder of the flying side 240A of the slider 224A is affected to a much lesser degree, if at all.

As the temperature of the slider 224A increases during use of the disk drive 10 and/or environmental temperature changes, the higher thermal expansion coefficient of the slider deformer 258A compared to the material in contact with the slider deformer 258A causes the slider deformer 258A to expand to a greater degree than the material in contact with the slider deformer 258A. As a result of this greater degree of expansion and the cross-crown orientation of the slider deformer 258A, the slider deformer 258A causes a deformation of the slider 224A in a cross-crown direction upon an increase in temperature. Further, because the slider deformer 258A is positioned near the trailing edge 248A of the slider 224A and/or in relatively close proximity to the read/write head 260A, deformation of the slider 224A is designed to partially or fully offset pole tip protrusion of the read/write head 260A toward the storage disk 16 caused by an increase in temperature.

For example, prior to heating the slider 224A, little or no pole tip protrusion occurs, resulting in a greater head-to-disk spacing. However, in one embodiment, the slider 224A provided herein can be manufactured to generate deformation, such as convexity of the flying side 240A, at cold temperatures, which positions the read/write head 260A closer to the storage disk 16 for increased accuracy during transfer of data, as illustrated in FIG. 2C.

Alternatively, the slider 224A can be manufactured to be substantially flat, or concave at cold temperatures. In these embodiments, the slider deformer 258A causes a portion of the slider 224A to become more concave as the temperature of the slider 224A increases.

Figure 2D:
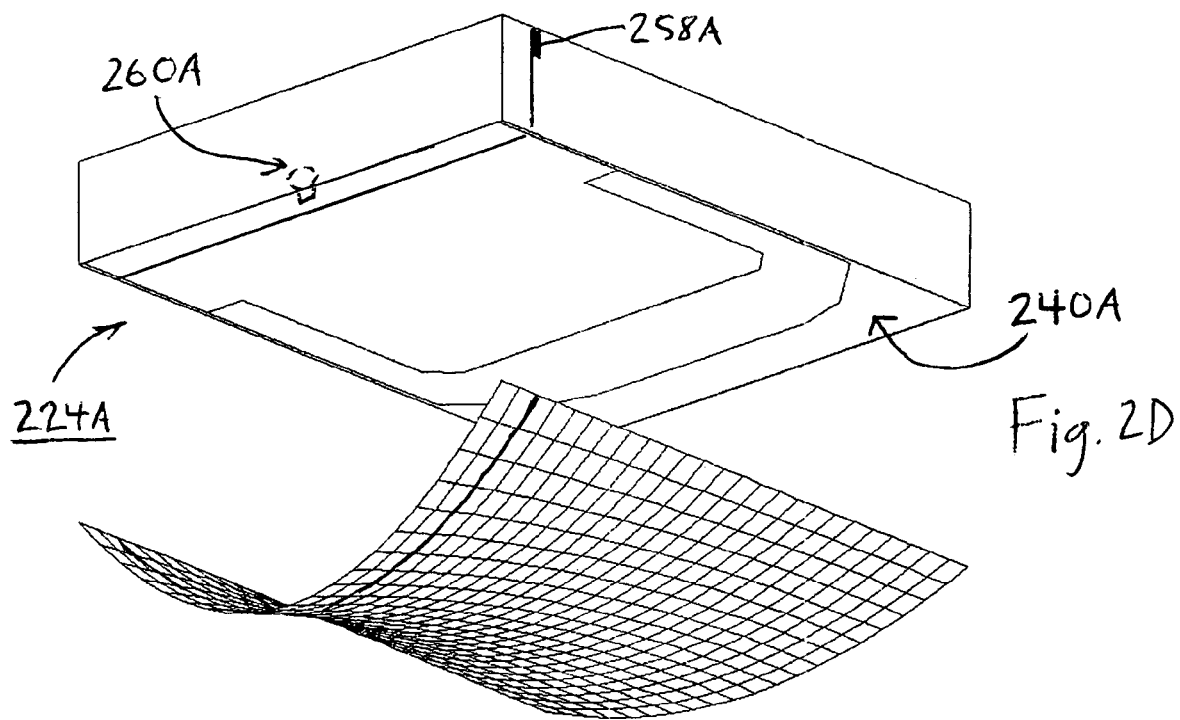
FIG. 2D is a bottom perspective view of the slider and the contour overlay illustrating deformation of the flying side of the slider at a second temperature.

FIG. 2D is a bottom perspective view of the slider 224A and a graphical representation showing surface effects of the flying side 240A of the slider 224A provided herein at a second temperature of the slider 224A, which is greater than the first temperature. FIG. 2D illustrates that once the temperature of the slider 224A increases, e.g. during a write operation, pole tip protrusion of the read/write head 260A occurs, and the slider deformer 258A causes a decrease in convexity (or an increase in concavity) of the flying side 240A of the slider 224A, thereby partially or fully counteracting the pole tip protrusion.

As an example, if the read/write head 260A extends 1 nanometer toward the storage disk 16 (illustrated in FIG. 1) due to pole tip protrusion, the slider deformer 258A can cause a deformation of the flying side 240A that results in an offsetting of the extension of the read/write head 260A. Thus, the read/write head 260A effectively moves toward the storage disk a distance that is somewhat less than 1 nanometer. In one embodiment, the configuration and materials of the slider deformer 258A are tuned to cause an offsetting deformation that is approximately similar to the distance that the read/write head 260A extends toward the storage disk 16. With this design, a substantially consistent head-to-disk spacing is maintained despite changes in temperature of the slider 224A. Stated another way, the slider deformer 258A can dynamically maintain a relatively constant head-to-disk spacing throughout various changes in temperature of the slider 224A and/or portions of the slider 224A.

Figure 2E:
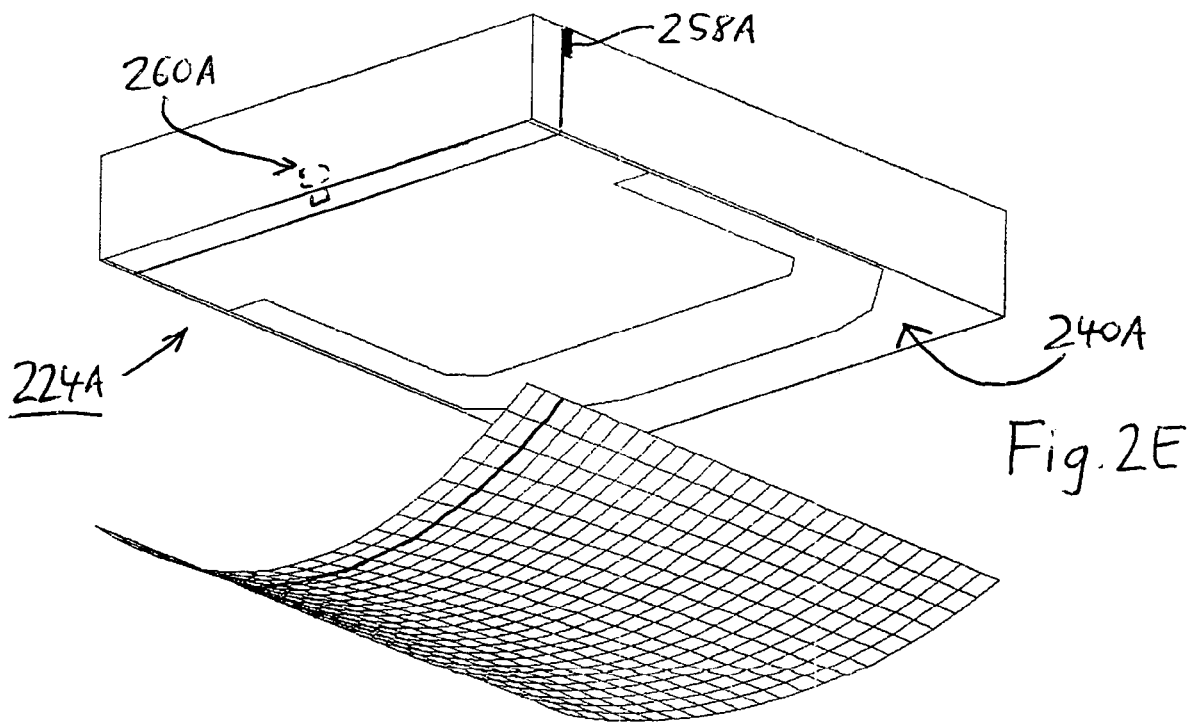
FIG. 2E is a bottom perspective view of the slider and the contour overlay illustrating deformation of the flying side of the slider at a third temperature.

FIG. 2E is a bottom perspective view of the slider 224A and a graphical representation showing surface effects of the flying side 240A of the slider 224A provided herein at a third temperature of the slider 224A, which is greater than the second temperature. FIG. 2E shows further heating of the slider 224A, which results in a greater degree of pole tip protrusion and a corresponding further decrease in convexity (or a further increase in concavity) of the flying side 240A of the slider 224A, continuing to partially or fully offset the pole tip protrusion.

In another embodiment, the slider 224A is manufactured so that at cold temperatures, the flying side 240A of the slider 224A is substantially flat. Once the temperature of the slider 224A increases, pole tip protrusion of the read/write head 260A occurs, which tends to decrease the head-to-disk spacing. However, as a result of the increase in temperature, the disparity in the coefficient of thermal expansions between the slider deformer 258A and other structures near the slider deformer 258A causes a concavity in the flying side 240A, thereby partially or fully counteracting the effect of the pole tip protrusion.

With these designs, the incidence of head-to-disk contact is reduced or eliminated, thereby inhibiting off-track writing, degraded data transfer rates, damage to the slider 224A, damage to the storage disk 16 and/or a permanent loss of data.

Figure 2F:
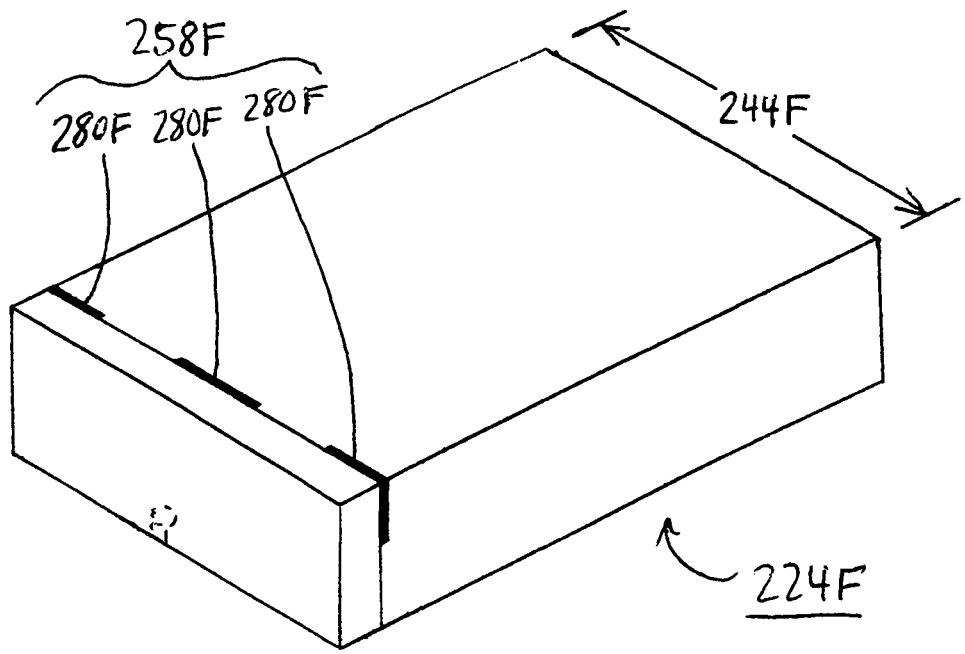
FIG. 2F is a top perspective view of another embodiment of the slider having features of the present invention.

FIG. 2F is a top perspective view of an alternative embodiment of the slider 224F. In this embodiment, the slider deformer 258F is discontinuous and therefore does not extend the entire width 244F of the slider 224F. Stated another way, the slider deformer 258F includes a plurality of deformer sections 280F that each acts to deform a portion of the slider 224F in a somewhat similar manner as that previously described. With this design, the deformation can be customized to provide specific deformation areas of the slider 224F to achieve the benefits stated herein.

Figure 2G:
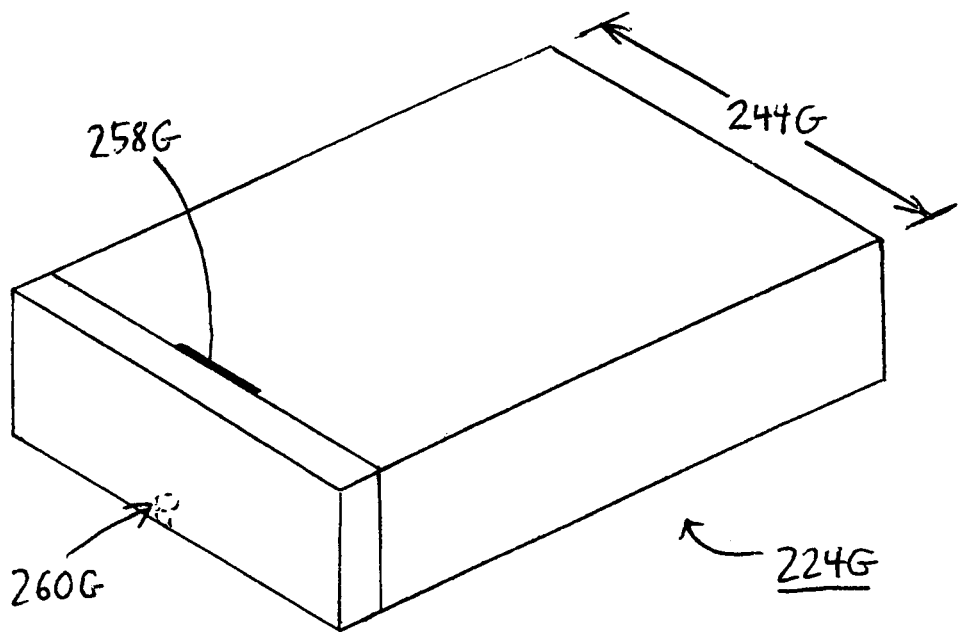
FIG. 2G is a top perspective view of yet another embodiment of the slider having features of the present invention.

FIG. 2G is a top perspective view of another embodiment of the slider 224G. In this embodiment, the slider deformer 258G is not discontinuous. However, the slider deformer 258G does not extend the entire width 244G of the slider 224G. Further, the slider deformer 258G is positioned toward the center of the slider 224G, near the read/write head 260G. It is recognized, however, that the slider deformer 258G in accordance with this embodiment can be positioned at any location along the width 244G of the slider 224G. Additionally, in non-exclusive alternative embodiments, the slider deformer 258G can extend at least approximately 10, 25, 50, 75 or 90 percent along the width of the slider 224G, as required by the design of the slider 224G and the disk drive 10.

Figure 3:
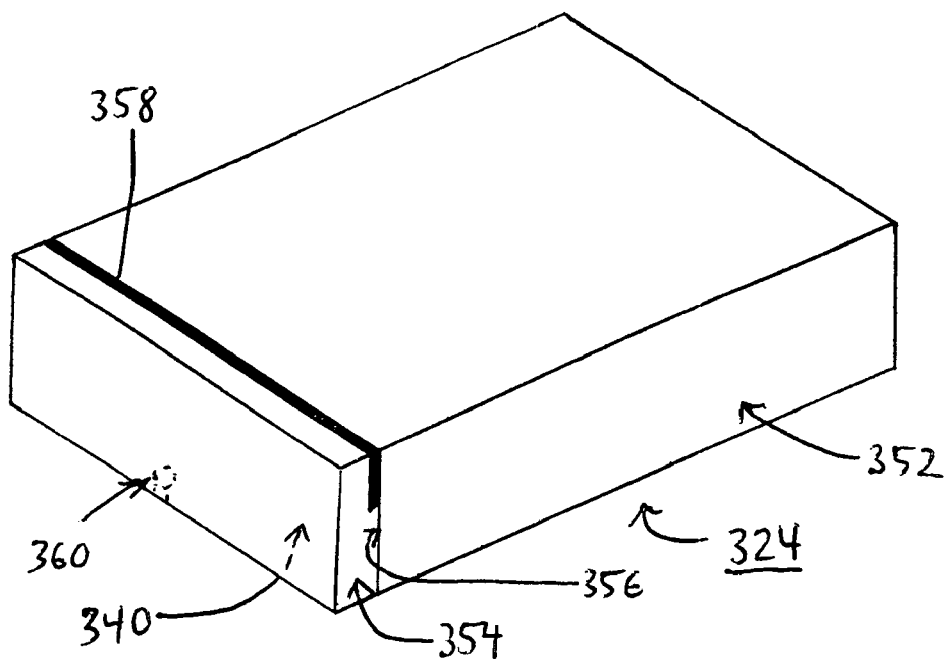
FIG. 3 is a top perspective view of still another embodiment of the slider having features of the present invention.

FIG. 3 is a top perspective view of still another embodiment of the slider 324. In this embodiment, the slider deformer 358 is positioned in the transducer section 354 rather than in the body section 352. Therefore, the body section 352 does not require any machining to prepare a notch 262 (illustrated in FIG. 2B). Instead, the slider deformer 358 is deposited or otherwise added to a substantially flat, rear body surface 356 of the body section 352. One or more of the remaining structures of the transducer section 354 can be deposited prior to or after the slider deformer 358 has been added in order to complete the transducer section 354 so that the slider deformer 358 is at least partially embedded within the interior of the slider 324. In other words, the slider deformer 358 contacts both the transducer section 354 and the body section 352. In one embodiment, the slider deformer 358 has greater contact with the transducer section 354 than with the body section 352. With this design, the slider deformer 358 can be positioned in closer proximity to the read/write head 360 in order to increase the ability of the slider deformer 358 to deform the flying side 340 of the slider 324 near the read/write head 360.

Figure 4:
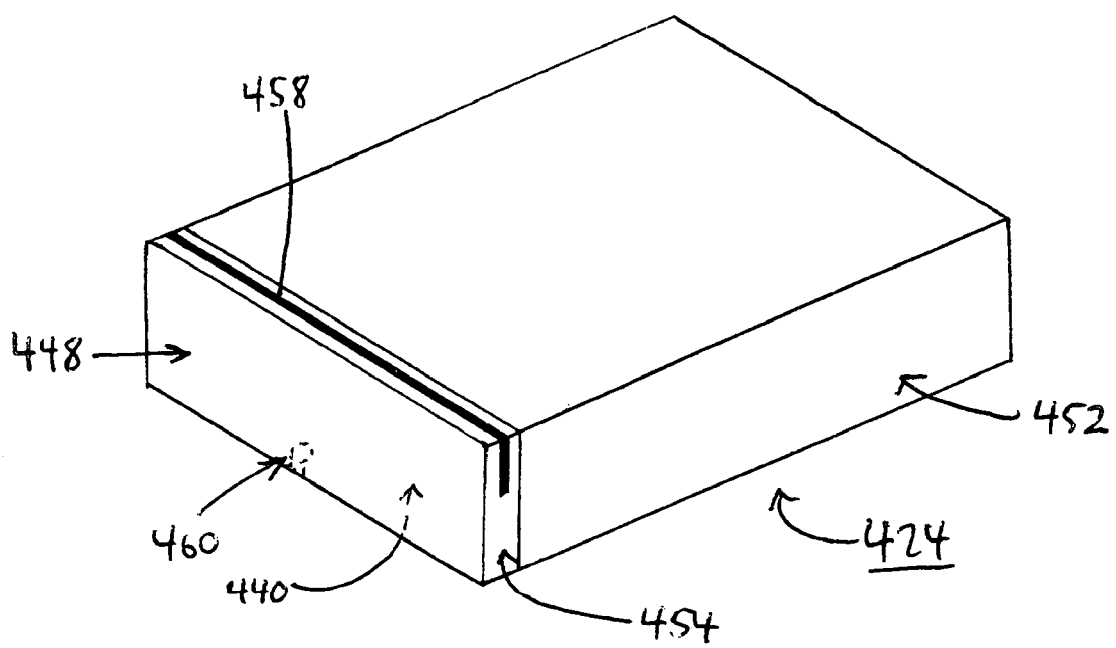
FIG. 4 is a top perspective view of another embodiment of the slider having features of the present invention.

FIG. 4 is a top perspective view of yet another embodiment of the slider 424. In this embodiment, the slider deformer 458 is fully positioned within the transducer section 454 rather than in the body section 452. Any contact between the slider deformer 458 and the remaining structures of the slider 424 occurs solely with the transducer section 454. Therefore, the body section 452 does not require a notch 262 (illustrated in FIG. 2B).

In this embodiment, the slider deformer 458 can be positioned as close to the trailing edge 448 as desired. One or more of the remaining structures of the transducer section 454 can be deposited prior to or after the slider deformer 458 has been added in order to complete the transducer section 454 so that the slider deformer 458 is at least partially embedded within the interior of the slider 424. Although the slider 424 in this embodiment may require an additional manufacturing deposition step, the slider deformer 458 can be positioned in closer proximity to the trailing edge 448 and/or the read/write head 460, thereby increasing the ability of the slider deformer 458 to deform the flying side 440 of the slider 424 at a specific location, such as near the read/write head 460.

Figure 5A:
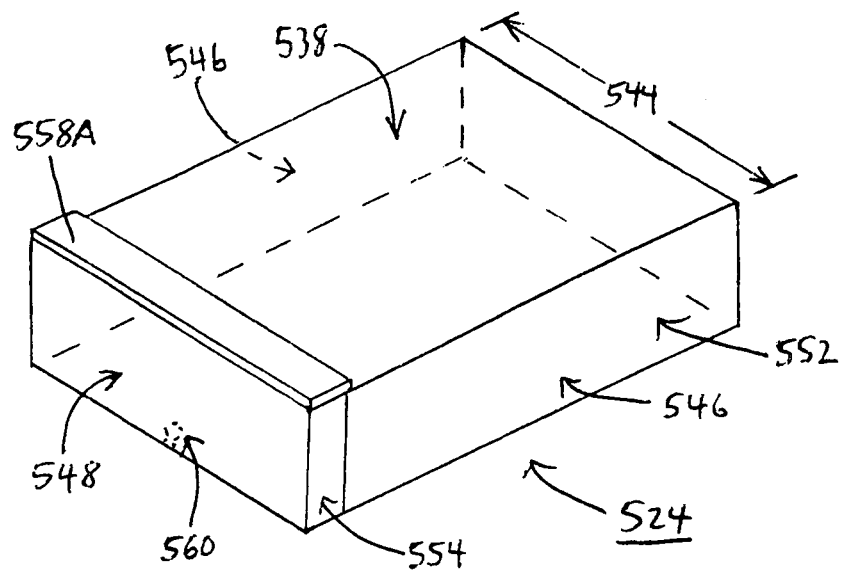
FIG. 5A is a top perspective view of the slider having features of the present invention including one embodiment of a slider deformer.
Figure 5B:
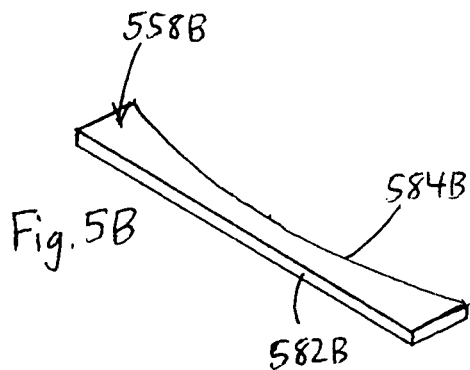
FIG. 5B is a top perspective view of another embodiment of the slider deformer.

FIG. 5A is a top perspective view of a further embodiment of the slider 524. In this embodiment, the slider deformer 558A is secured to the back side 538 of the slider 524 in an area above the transducer section 554. Thus, the slider deformer 558A can be a strip of material such as a metallic, ceramic or other suitable material that is secured to the back side 538 at a convenient time during manufacturing. For example, the slider deformer 558A can be secured to the back side 538 after all other layers of material have been deposited or otherwise added to the body section 552. Additionally, the slider deformer 558A can be secured to the back side 538 prior to securing the slider 524 to the suspension 32 (illustrated in FIG. 1). With this design, manufacturing of the slider 524 can be facilitated. The slider deformer 558A can be rigidly affixed to one or both of the body section 552 and the transducer section 554 using an epoxy or other adhesive, or any other suitable fusing technology.

Further, the material that forms the slider deformer 558A can have the same properties as the slider deformers previously described herein relative to the materials that form the remainder of the slider 524, such as having a relatively high coefficient of thermal expansion, as a non-exclusive example.

FIGS. 5B-5E are examples of alternative embodiments of the slider deformer 558A having varying dimensions, each of which can be described with reference to the structures illustrated in FIG. 5A for convenience. In these embodiments, the slider deformer 558B-E can be secured to the body section 552 and/or transducer section 554 in a somewhat similar manner as the slider deformer 558A described relative to FIG. 5A. In the embodiment illustrated in FIG. 5B, the slider deformer 558B has a substantially linear back edge 582B that can follow the contour of the trailing edge 548 of the slider 524. Further, in this embodiment, the slider deformer 558B has a substantially arcuate front edge 584B such that the width of the slider deformer 558B is greater toward the lateral surfaces 546 of the slider 524.

Figure 5C:
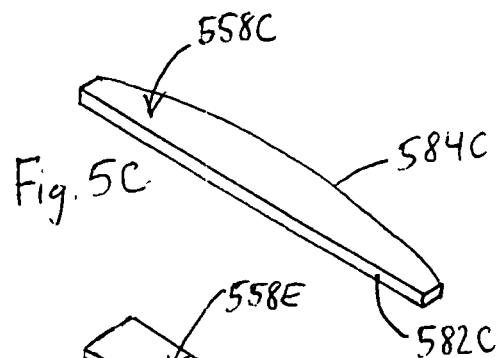
FIG. 5C is a top perspective view of yet another embodiment of the slider deformer.

In the embodiment illustrated in FIG. 5C, the slider deformer 558C has a substantially linear back edge 582C that can follow the contour of the trailing edge 548 of the slider 524. Further, in this embodiment, the slider deformer 558C has a substantially arcuate front edge 584C such that the width of the slider deformer 558C is greater toward a center of the slider 524, e.g., in the vicinity of the read/write head 560.

Figure 5D:
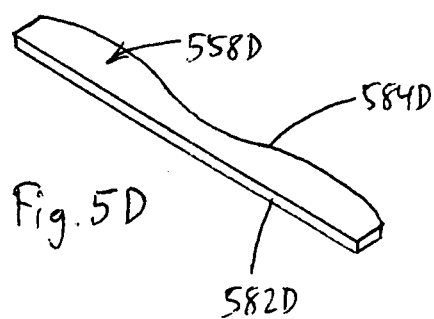
FIG. 5D is a top perspective view of still another embodiment of the slider deformer.

In the embodiment illustrated in FIG. 5D, the slider deformer 558D has a substantially linear back edge 582D that can follow the contour of the trailing edge 548 of the slider 524. Further, in this embodiment, the slider deformer 558D has a substantially multiple curved front edge 584D such that the width of the slider deformer 558D is lesser toward the lateral surfaces 546 of the slider 524 and toward the center of the slider 524, and greater at one or more other locations along the width 544 of the slider 524.

Figure 5E:
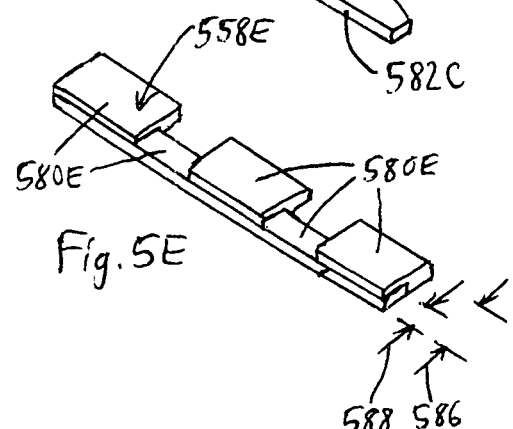
FIG. 5E is a top perspective view of a further embodiment of the slider deformer.

In the embodiment illustrated in FIG. 5E, the slider deformer 558E has a somewhat discontinuous configuration. For example, the slider deformer 558E can have one or more deformer sections 580E that are either partially or fully etched so that certain deformer sections 580E extend a greater height above the back side 538 of the slider 524 than other deformer sections 580E. Further, the slider deformer 558E can have one or more deformer sections 580E that have a width 586 that is greater than the width 588 of one or more other deformer sections 580E, as illustrated in FIG. 5E. With this design, the slider deformer 558E can provide localized strength or weakness to certain portions of the slider 524 to achieve the desired deformation of the slider 524.

Figure 5F:
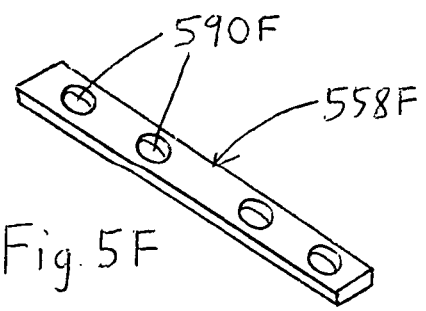
FIG. 5F is a top perspective view of an additional embodiment of the slider deformer.

In the embodiment illustrated in FIG. 5F, the slider deformer 558F includes one or more deformer apertures 590F that extend through the slider deformer 558F. The number and positioning of the deformer apertures 590F can vary so that the slider deformer 558F can provide localized strength or weakness to certain portions of the slider 524 to achieve the desired deformation of the slider 524.

With each of the embodiments illustrated in FIGS. 5A-5F, the deformation of the slider 524 can be tailored to achieve the desired effect depending upon the configuration of the slider 524 and the configuration and positioning of the components within the slider 524.

Figure 6:
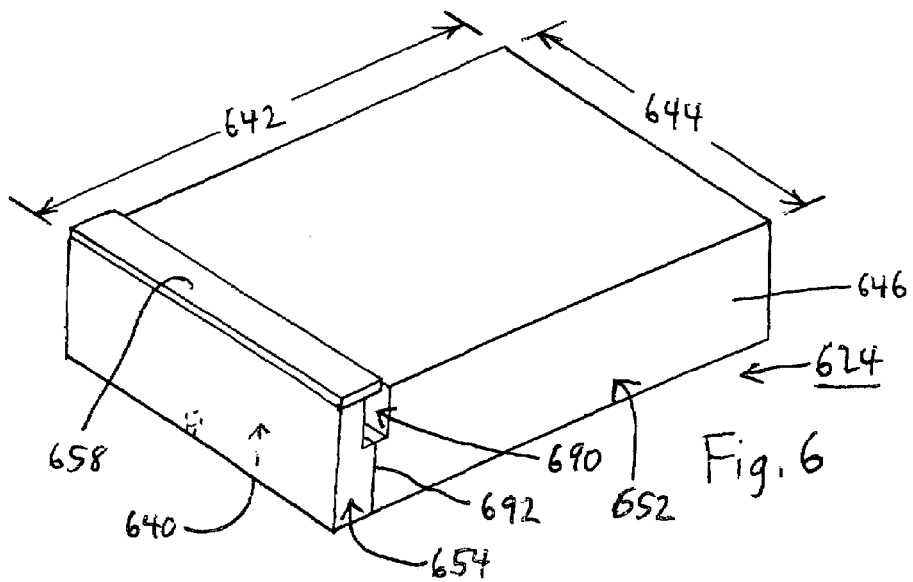
FIG. 6 is a top perspective view of another embodiment of the slider having features of the present invention.

FIG. 6 is a top perspective view of another embodiment of the slider 624, including the slider deformer 658. In this embodiment, the slider deformer 658 can be substantially similar to any of the slider deformers previously described. However, in this embodiment, the slider 624 also has a slider depression 690 that is partially or completely unfilled with any other materials. The slider depression 690 structurally weakens the slider 624 in a preferential manner and region to allow a greater effective deformation by the slider deformer 658.

The location of the slider depression 690 can vary. In one embodiment, the slider depression 690 can be positioned at or near a junction 692 between the body section 652 and the transducer section 654. In an alternative embodiment, the slider depression can be positioned away from the junction 692. For example, in the embodiment illustrated in FIG. 6, the slider depression 690 can be partially within the body section 652 and partially within the transducer section 654. In alternative embodiments, the slider depression 690 can be positioned entirely within the body section 652 or entirely within the transducer section 654. Moreover, the slider depression 690 can extend to one or more of the lateral surfaces 646 of the slider 624.

The dimensions of the slider depression 690 can vary depending upon the desired effect of the slider deformer 658. Depending on these dimensions, as well as the positioning of the slider depression 690, the slider deformer 658 can have a more pronounced impact on the level of deformation of the flying side 640 of the slider 624. Further, the slider depression 690 can be discontinuous, e.g., can include a plurality of slider depressions 690, or can have a width that varies along the length of each slider depression 690. In still another embodiment, the slider depression 690 can be longitudinal, e.g., can extend partially or fully along the length 642 of the slider 624 rather than the width 644. In addition, the depth of each slider depression 690 can be varied to weaken the slider 624 as required by the disk drive 10.

In the embodiment illustrated in FIG. 6, the slider depression 690 extends to at least one of the lateral surfaces 646 (only one lateral surface 646 is illustrated in FIG. 6) of the slider 624. However, in an alternative embodiment, the slider depression 690 does not extend to either lateral surface 646.

Figure 7:
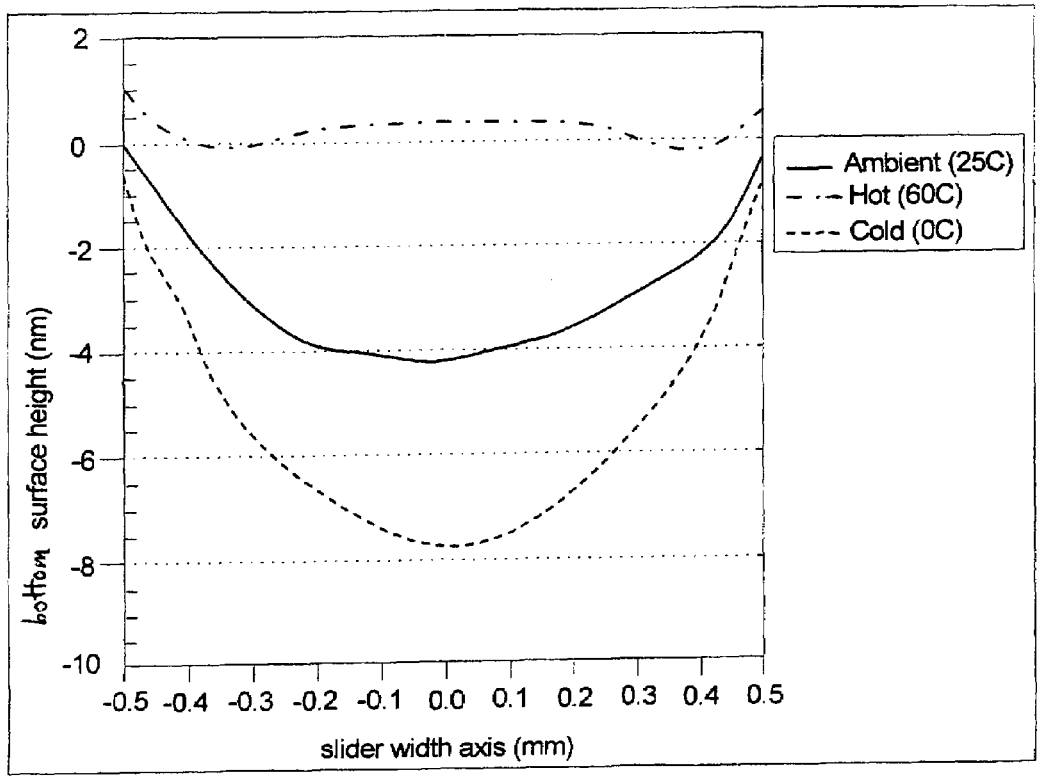
FIG. 7 is a graphical representation derived from a finite element simulation of the slider and showing deformation of a portion of a slider having features of the present invention as a function of temperature.

FIG. 7 is a graph of finite element simulation data showing the amount of deformation of the flying side of the slider as a function of temperature change of the slider and location along the width of the slider at the trailing edge, using a slider that includes a slider deformer as described herein. This graph illustrates that as temperature increases, deformation of the slider caused by the disparity in coefficients of thermal expansion as described above results in the slider moving the read/write head away from a storage disk.

For example, as temperature increases from 25 C to 60 C, the convexity of the flying side of the slider decreases, effectively increasing the distance between the flying side of the slider and the storage disk. Thus, as pole tip protrusion occurs with an increase in temperature, the deformation of the slider would partially or fully compensate for this increase.

Conversely, as temperature decreases from 25 C to 0 C, the convexity increases, effectively decreasing the distance between the flying side of the slider and the storage disk. As pole tip protrusion decreases with a decrease in temperature, the deformation of the slider would partially or fully compensate for this decrease.

In each of the foregoing embodiments, one or more features from other embodiments described herein can also be incorporated. As one example, any of the above embodiments of the slider deformer can incorporate a discontinuity so that the slider deformer includes a plurality of deformer sections. As another non-exclusive example, the slider deformer can be partially embedded into at least one of the body section and the transducer section, while also extending above the back side of the slider. Moreover, any of the embodiments of the slider can include a slider depression that increases the ability of the slider deformer to deform the flying side of the slider.

These examples are provided solely to point out that alternative embodiments too numerous to include herein can be manufactured without deviating from the spirit of the present invention.

While the particular slider 24 and disk drive 10, as herein shown and disclosed in detail, are fully capable of obtaining the objects and providing the advantages herein before stated, it is to be understood that they are merely illustrative of various embodiments of the invention. No limitations are intended to the details of construction or design herein shown other than as described in the appended claims.

What is claimed is:

1. A disk drive comprising:
   a drive circuitry;
   a suspension; and
   a slider that is supported by the suspension and receives electrical current from the drive circuitry, the slider including (i) a flying side that is configured to generally face storage media, (ii) a back side that is substantially opposite the flying side, (iii) a read/write head that is capable of magnetically interacting with storage media, the read/write head moving relative to the back side when the temperature of the read/write head changes, and (iv) a slider deformer that is electrically decoupled from the drive circuitry, the slider deformer deforming of a portion of the flying side when the temperature of the slider deformer changes so that the deformation at least partially offsets the movement of the read/write head that occurs when the temperature of the read/write head changes, the slider further includes a support material that contacts the slider deformer, the support material having a first coefficient of thermal expansion, and wherein the slider deformer has a second coefficient of thermal expansion that is at least approximately 25 percent greater than the first coefficient of thermal expansion.

2. The disk drive of claim 1 wherein the slider deformer extends at least approximately 25 percent along a width of the slider.

3. The disk drive of claim 1 wherein the slider deformer extends along a majority of a width of the slider.

4. The disk drive of claim 1 wherein the slider includes a body section and a transducer section that is deposited onto the body section, and wherein the slider deformer is at least partially embedded within at least one of the body section and the transducer section.

5. The disk drive of claim 4 wherein the body section includes a notch, and wherein the slider deformer is at least partially positioned within the notch.

6. The disk drive of claim 4 wherein slider deformer is positioned entirely within the transducer section.

7. The disk drive of claim 1 wherein the slider deformer is at least partially embedded between the back side and the flying side of the slider.

8. The disk drive of claim 7 wherein no portion of the slider deformer extends away from the back side of the slider.

9. The disk drive of claim 1 wherein the slider includes a body section and a transducer section that is deposited onto the body section, and wherein the slider deformer is at least partially affixed to the back side in the transducer section.

10. The disk drive of claim 9 wherein no portion of the slider deformer is embedded in the transducer section between the back side and the flying side.

11. The disk drive of claim 9 wherein the slider deformer includes a plurality of deformer sections that are formed by selective etching of the slider.

12. The disk drive of claim 1 wherein the read/write head is configured to extend in a direction toward storage media when the temperature of the slider increases, and the slider deformer deforms the flying side of the slider to dynamically maintain a head-to-disk spacing when the temperature of the slider deformer increases.

13. The disk drive of claim 1 wherein the slider further includes a slider depression that is at least partially unfilled, the slider depression weakening the slider to allow an increase in deformation by the slider deformer to the flying side of the slider.

14. The disk drive of claim 13 wherein the slider includes a body section and a transducer section that is deposited onto the body section, and wherein the slider depression is positioned at least partially on a junction between the body section and the transducer section.

15. The disk drive of claim 13 wherein the slider includes two opposing lateral surfaces, and wherein the slider depression extends to at least one of the lateral surfaces.

16. The disk drive of claim 13 wherein the slider depression is positioned at the back side of the slider.

17. A disk drive comprising:
a drive circuitry;
a suspension; and
a slider that receives electrical current from the drive circuitry, the slider including (i) a leading edge, (ii) a trailing edge, (iii) a length that extends between the leading edge and the trailing edge, (iv) a width that is substantially perpendicular to the length, (v) a flying side that is configured to generally face storage media, (vi) a back side that is opposite the flying side, (vii) a slider interior positioned directly between the flying side and the back side, and (viii) a slider deformer that is electrically decoupled from the drive circuitry, the slider deformer being at least partially embedded within the slider interior along at least approximately 50 percent of the width of the slider, the slider deformer causing a deformation of a portion of the flying side when the temperature of the slider deformer changes, the slider further includes a support material that contacts the slider deformer, the support material having a first coefficient of thermal expansion, and wherein the slider deformer has a second coefficient of thermal expansion that is at least approximately 50 percent greater than the first coefficient of thermal expansion.

18. The disk drive of claim 17 wherein the entire slider deformer is substantially embedded within the slider interior.

19. The disk drive of claim 17 wherein the slider includes a read/write head that is configured to magnetically interact with storage media, the read/write head moving relative to the back side when the temperature of the read/write head changes, and wherein the slider deformer deforms a portion of the flying side when the temperature of the slider deformer changes so that the deformation at least partially offsets the movement of the read/write head that occurs when the temperature of the read/write head changes.

20. The disk drive of claim 19 wherein the read/write head extends in a direction away from the back side when the temperature of the slider increases, and the slider deformer deforms the flying side of the slider to dynamically maintain a substantially consistent head-to-disk spacing while the temperature of the slider increases.

21. The disk drive of claim 17 wherein the slider includes a body section and a transducer section that is deposited onto the body section, the body section including a notch that at least partially supports the slider deformer.

22. The disk drive of claim 17 wherein the slider deformer includes a plurality of discontinuous deformer sections.

23. The disk drive of claim 17 wherein the slider further includes a slider depression that is at least partially unfilled, the slider depression being positioned to allow the slider deformer to cause greater deformation to the flying side of the slider during a change in temperature of the slider deformer.

24. The disk drive of claim 23 wherein the slider includes a body section and a transducer section that is deposited onto the body section, and wherein the slider depression is positioned at least partially on a junction between the body section and the transducer section.

25. A disk drive comprising:
a drive circuitry;
a suspension; and
a slider that is supported by the suspension and receives electrical current from the drive circuitry, the slider including (i) a flying side that is configured to generally face storage media, (ii) a back side that is opposite the flying side, and (iii) a slider deformer that is electrically decoupled from the drive circuitry, a portion of the slider deformer forming a portion of the back side of the slider, the slider deformer causing a deformation of a portion of the flying side when the temperature of the slider deformer changes, the slider includes a support material that contacts the slider deformer, the support material having a first coefficient of thermal expansion, the slider deformer being formed from a material having a second coefficient of thermal expansion that is at least approximately 25 percent greater than the first coefficient of thermal expansion.

26. The disk drive of claim 25 wherein the slider deformer extends at least approximately 25 percent along a width of the slider.

27. The disk drive of claim 25 wherein the slider deformer extends along a majority of a width of the slider.

28. The disk drive of claim 25 wherein the slider includes a body section and a transducer section that is deposited onto the body section, and wherein the slider deformer is at least partially embedded within at least one of the body section and the transducer section.

29. The disk drive of claim 28 wherein the body section includes a notch, and wherein the slider deformer is at least partially positioned within the notch.

30. The disk drive of claim 28 wherein slider deformer is positioned entirely within the transducer section.

31. The disk drive of claim 25 wherein the slider deformer is at least partially embedded between the back side and the flying side of the slider.

32. The disk drive of claim 31 wherein no portion of the slider deformer extends away from the back side of the slider.

33. The disk drive of claim 25 wherein the slider includes a body section and a transducer section that is deposited onto the body section, the transducer section having a back side, and wherein the slider deformer is at least partially affixed to the back side of the transducer section.

34. The disk drive of claim 33 wherein no portion of the slider deformer is embedded into the transducer section below the back side.

35. The disk drive of claim 25 wherein the slider deformer includes a plurality of spaced apart deformer sections.

36. The disk drive of claim 25 wherein the slider further includes a slider depression that is at least partially unfilled, the slider depression weakening the slider to allow the slider deformer to cause greater deformation to the flying side of the slider.

37. The disk drive of claim 25 wherein the slider includes a read/write head that is capable of magnetically interacting with storage media, the read/write head moving relative to the back side when the temperature of the read/write head changes, and wherein the slider deformer deforms a portion of the flying side when the temperature of the slider deformer changes so that the deformation at least partially offsets the movement of the read/write head that occurs when the temperature of the read/write head changes.

38. A disk drive comprising:
- a drive circuitry;
- a suspension; and
- a slider that is supported by the suspension and receives electrical current from the drive circuitry, the slider including (i) a flying side that is configured to generally face storage media, (ii) a back side that is substantially opposite the flying side, (iii) a read/write head that is configured to magnetically interact with storage media, the read/write head moving relative to the back side when the temperature of the read/write head changes, (iv) a support material having a first coefficient of thermal expansion, and (v) a slider deformer that is electrically decoupled from the drive circuitry, the slider deformer contacting the support material, the slider deformer being formed from a second material having a second coefficient of thermal expansion that is 50% greater than the first coefficient of thermal expansion, the slider deformer deforming of a portion of the flying side when the temperature of the slider deformer changes so that the deformation at least partially offsets the movement of the read/write head that occurs when the temperature of the read/write head changes.

* * * * *

UNITED STATES PATENT AND TRADEMARK OFFICE
CERTIFICATE OF CORRECTION

PATENT NO. : 7,646,566 B1
APPLICATION NO. : 11/042736
DATED : January 12, 2010
INVENTOR(S) : Crimi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1136 days.

Signed and Sealed this

Sixteenth Day of November, 2010

David J. Kappos
*Director of the United States Patent and Trademark Office*